United States Patent [19]

Dominge

[11] 4,382,332
[45] May 10, 1983

[54] PRUNING MACHINE

[75] Inventor: Richard A. Dominge, Mission Viejo, Calif.

[73] Assignee: Bordier's Nursery California, Inc., Santa Ana, Calif.

[21] Appl. No.: 289,751

[22] Filed: Aug. 3, 1981

[51] Int. Cl.³ .............................................. A01G 3/00
[52] U.S. Cl. ........................................ 30/379; 47/4; 83/425; 99/546
[58] Field of Search ................. 30/379, 379.5; 99/539, 99/546; 83/109, 435, 425; 47/4

[56] References Cited

U.S. PATENT DOCUMENTS

| | | | |
|---|---|---|---|
| 295,791 | 3/1884 | Milne | 83/425 X |
| 1,817,678 | 8/1931 | Dunseth | 83/435 |
| 2,192,838 | 3/1940 | McGrew | 99/546 X |
| 3,074,447 | 1/1963 | Bombardier | 83/109 X |
| 3,820,450 | 6/1974 | Rasmussen | 99/546 X |

Primary Examiner—Jimmy C. Peters
Attorney, Agent, or Firm—G. Donald Weber, Jr.

[57] ABSTRACT

This trimming apparatus is conveniently mounted on a vehicle. It has a conveyor that includes belts that push the potted plants along a wall so as to rotate the plants while at the same time the plants are passed by the cutters. Thus the entire periphery of the plant is trimmed.

10 Claims, 7 Drawing Figures

PRUNING MACHINE

BACKGROUND

1. Field of the Invention

This invention is directed to nursery equipment, in general, and to a pruning apparatus, in particular.

2. Prior Art

There are many types of pruning machines and/or apparatus available known in the known art. However, most of the pruning and cutting of plants is done by hand. As a result, the nursery business is highly labor intensive. This situation leads to many difficulties and/or problems. For example, a relatively large crew of workers is required in order to maintain the nursery stock in proper condition. The expense of individual labor is an ever increasing cost of doing business. It is, therefore, highly desirable to render the situation less labor intensive and more capital equipment intensive. Moreover, it is becoming more and more difficult to find personnel who are of the unskilled or semi-skilled classification who will perform many of the tasks which are required in handling nursery stock.

As a bit of background, it is explained that much nursery stock must be handled and tended frequently while at the nursery. For example, in the case of so-called 1-gallon or 5-gallon plants of the evergreen type, it is highly desirable to effect various pruning operations. One of the pruning operations is a vertical prune along the sides of a plant to prevent the plant from becoming too bushy and spreading out in a horizontal fashion. The reasons for this are several. First of all, the larger the plant, the more surface area which it requires. This translates into fewer plants per acre wherein costs of maintaining a nursery are increased. In addition, if the plants tend to spread too widely, some of the lower growth is then shaded by the upper growth and tends to wither and die. This has the dual effect of causing the plant to be less saleable from an esthetic point of view, and furthermore, causing the plant to tend to grow tall and scraggly.

In the past, each of these plants had to be handled individually. That is, the plants were separated from the other plants in the storage field (in containers of 1-gallon or 5-gallon size) and then trimmed by the field hand using a hand pruning machine. The field hand or cutter was required to turn the plant during the pruning or to physically move about the plant himself. The plants then had to be restacked in as close proximity to each other as possible in order to preserve ground as suggested above. Also, the pruning was somewhat erratic because of the hand labor involved.

In the past, using this technique, a crew of twelve workers, operating at high efficiency, could cut and trim approximately 10,000 plants of the 1-gallon size in 8 hours. Consequently, in a large scale wholesale nursery, a crew of this size could be permanently assigned to merely performing the "vertical prune" function, as described.

SUMMARY OF THE INVENTION

There is shown and described a pruning apparatus which performs a cutting or pruning of nursery livestock in a rapid or semi-automated manner. The apparatus is arranged to provide the appropriate trim to nursery livestock in a fashion that is more uniform than hand pruning and far more rapid.

DESCRIPTION OF A PREFERRED EMBODIMENT

It is to be understood that the apparatus shown and described herein is illustrative of one embodiment thereof. The embodiment shown herein is representative of an actual model but is not limitative of the inventive concepts shown and described.

Figure 1:
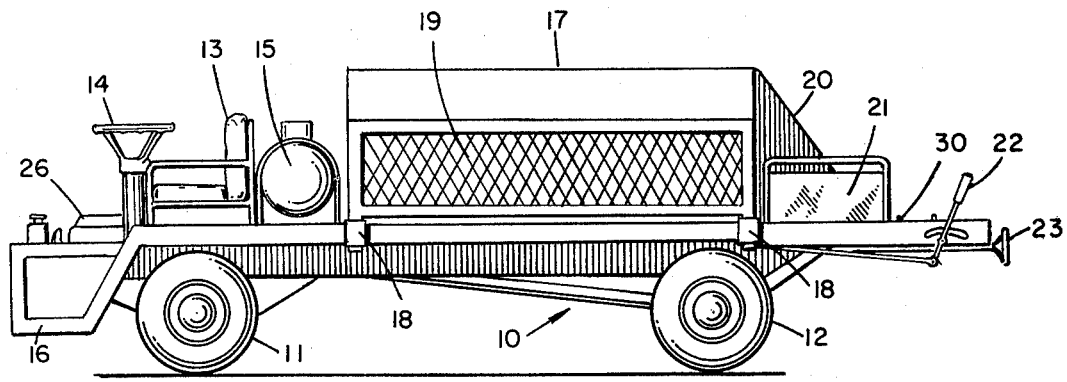
FIG. 1 is a side view of one embodiment of the instant invention.

Referring now to FIG. 1, there is shown a side view of one embodiment of the overall apparatus of the instant invention. In the preferred embodiment, the apparatus is constructed on the chassis 10 of any suitable construction. Of course, a non-mobile unit would be constructed on a stationary base of suitable design.

The chassis 10 is supported by a pair of front wheels 11 and a pair of back wheels 12 which are mounted in typical fashion to the chassis. The apparatus of the preferred embodiment includes a seat 13 which on an operator can be seated when moving the apparatus from one location to another. A steering wheel 14 is provided to control the direction of the pruning apparatus when being moved. In the preferred embodiment, the pruning apparatus is converted to operate using propane fuel which is stored in tank 15. An appropriate foot rest 16 is provided for the convenience of the driver.

A cover 17 is arranged to be mounted on the apparatus in any suitable fashion. In the preferred embodiment, the cover 17 includes legs at the corners thereof which are inserted into mounting slots 18, affixed to the apparatus base (or chassis 10). A side portion 19 can be arranged to provide visibility within the cover 17. In a typical case, side port 19 is fabricated of clear material such as transparent plastic or the like. For safety, an expanded metal grid can be mounted thereover as well. Of course, the expanded metal grid could be used alone but the plastic liner provides a safety feature in preventing objects from being inserted into the apparatus or cuttings from being thrown therefrom. The cover 17 includes, in this embodiment, projection 20 adjacent the rear portion of the entire apparatus. This projection 20 can be considered to be a chute and is provided to prevent cuttings produced by the apparatus from flying out of the rear of the apparatus indescriminately. The chute 20 also causes the cuttings to be deflected downwardly at the rear of the unit. The cuttings can fall to the ground or become captured in a bin (not shown), if so desired.

In the embodiment shown in FIG. 1, there is included a shield 21 (one on each side of the apparatus) to inhibit the insertion of hands or other objects into the pruning apparatus. A brake handle 22 is also mounted at the rearward portion of the apparatus to provide a separate brake control so that the apparatus can be stopped from moving along the ground when the work station is achieved. This brake handle 22 is more frequently used when the apparatus is at the work station and the entire apparatus is controlled by the operators who are working at the rear portion of the apparatus, as will be described hereinafter. A first control knob 23 is shown at the rear of the apparatus. This particular control is used to control the hydraulic system of the apparatus, and to selectively apply motive force to the apparatus wherein the apparatus selectively moves backwardly (to the right in FIG. 1) whereby movement of the entire apparatus can be controlled from the rear of the apparatus, not merely from the driver's seat 13.

Figure 2:
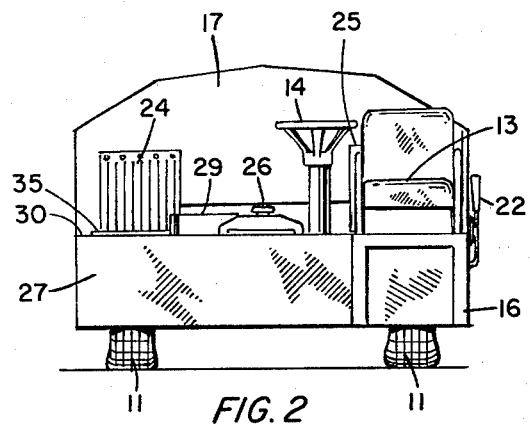
FIG. 2 is a front view of the embodiment shown in FIG. 1.

Referring now to FIG. 2, there is shown a front end view of the apparatus. The front wheels 11 are shown along with the driver's seat 13, the steering wheel 14, the foot rest 16 and engine 26. A front bumper or housing 27 is also shown. This member is used to cover the front end of engine 26 and the like. The cover 17 is mounted on top of the chassis while hand brake 22 is mounted at the side thereof.

In the embodiment shown in FIG. 2, cover 17 has openings 24 and 25 adjacent to the opposite sides thereof. In the preferred embodiment, these openings include flaps or the like which depend from a mounting area at the top of the openings. These flaps inhibit the cuttings from being projected through the openings but permit plants to pass readily therethrough as will be described hereinafter. The apparatus includes a surface 30 onto which seat 13 is mounted and which forms the basic surface for the apparatus as well. A barrier 29 is mounted on surface 30 and is used to direct plants which have passed through the cutting operation as described hereinafter. A roller or conveyor-type apparatus 28 is also shown. The conveyor 28 is mounted in an opening in surface 30 and is arranged to transport plants which have been pruned to the off-load area of the apparatus.

Figure 3:
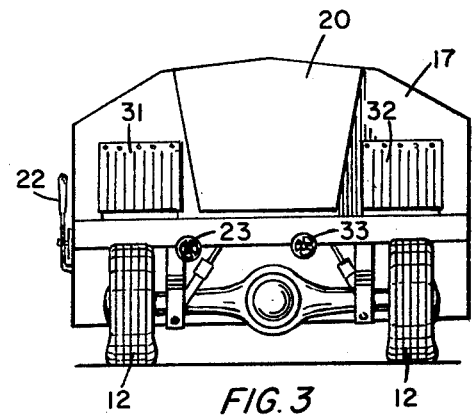
FIG. 3 is a rear view of the embodiment shown in FIG. 1.

Referring now to FIG. 3, there is shown the rear view of the apparatus with cover 17 in place. Again, wheels 12 and a suitable axle 34 are shown mounted in a standard fashion to the chassis. The arrangement of chute 20 relative to cover 17 is depicted. This chute is located between openings 31 and 32 in cover 17. Openings 31 and 32 include depending flaps similar to those which are mounted at opening 24 and 25 at the front end of cover 17. Brake mechanism 22 is also shown. Valve handle 23 and valve handle 33 are shown as well. Valve handle 23, as noted, controls the selective application of hydraulic power to the pruning apparatus of the instant invention. In a similar manner, valve 33 selectively controls the application of hydraulic power of the driving mechanism which activates the pruning apparatus, per se. Thus, the pruning apparatus can be controlled by valve handle 33 while the relative motion of the entire apparatus is controlled by valve handle 23. The hydraulic power system can be arranged as part of a power take-off from engine 26 in any suitable fashion.

Figure 4:
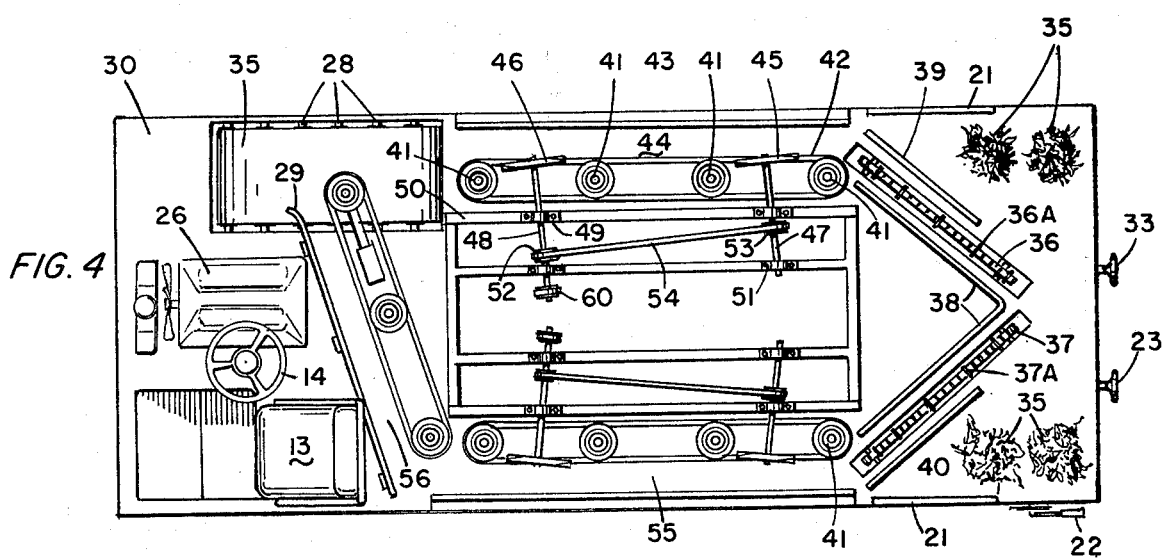
FIG. 4 is a top view of the embodiment shown in FIG. 1 with the cover removed.

Referring now to FIG. 4, there is shown a schematic representation of the pruning apparatus. This view is taken from the top of the apparatus with cover 17 removed so that the pruning mechanism can be observed.

Elements shown in FIG. 4 which are similar to elements shown in FIGS. 1 through 3 bear similar reference numerals and are not described herein in detail. At the rear (right side in this Figure) of the apparatus is the on-loading portion of surface 30. This portion of the surface 30 is fairly large and permits potted plants 35 to be placed thereon for further operation. A pair of chains 36 and 37 are shown. These chains are located within slots in surface 30 and arranged to move in diverging directions. That is, the chains move from right to left in FIG. 4 as shown. Each of the chains 36 and 37 includes a plurality of links arranged to be driven by a suitable gear mechanism, not shown. In addition, each of the chains 36 and 37 includes a plurality of upright pusher lugs 36A and 37A, respectively. These lugs are moved along with the chain and are adapted to push an object, e.g., a plant 35, along the direction of the moving chain.

The chains move in channels which are defined by walls or barriers. In particular, a first barrier 38 is essentially V-shaped and can be formed as a single piece. Likewise, barriers or walls 39 and 40 are disposed on the opposite sides of chains 36 and 37, respectively.

A plurality of pulleys 41 are arranged, in-line, along the length of the apparatus and spaced from the edges thereof. Means for driving the pulleys is mounted below the chains 10 and can take any desirable form. This driving means is controlled by valve 33 noted above. A belt 42 is arranged to engage each of the pulleys 41 and be driven thereby. The belt apparatus is also spaced from the edge of the apparatus as defined by wall 43. The edge of the apparatus can be formed integrally with or mounted directly to the chassis which supports surface 30. Wall 43 can be selectively movable to permit adjustment of channel 44 width. Thus, a channel 44 is produced between wall 43 and belts 42. This channel 44 is referred to as the plant or cutting channel. Adjacent to the cutting channel 44 and mounted above belts 42 is, in this embodiment, a pair of cutting blades 45 and 46, respectively. Blades 45 and 46 are mounted on shafts 47 and 48, respectively. The shafts are mounted in bushings 49 on a support member 50 in a suitable fashion. Likewise, the shafts may be mounted in suitable bushings 51 at the other end thereof. Also mounted to shafts 47 and 48 are pulleys 52 and 53 which are joined together and driven by a belt 54. Another pulley/belt mechanism 60 is used to provide drive to the blade apparatus.

The opposite side of the apparatus includes a plant channel 55 which is arranged in a similar manner to include similar components which are not described herein in detail in order to avoid undue complexity. However, it should be understood that the same type of operation is achieved at channel 44 and channel 55 and any other channels which may be included in the apparatus. Of course, the more channels which are provided, the more complicated the mechanism becomes but the greater the number of plants which can be handled.

In operation, the pruning apparatus is driven to the location where the pruning is to take place. The engine is left running but the controls are switched, so as to be controlled by valve handle 33 at the rear of the apparatus. Assume that the final positioning is achieved by operation of valve handle 23 and the position is maintained by the application of brake 22. Operation of valve handle 33 then begins the operation of the entire cutting portion of the apparatus. That is, the prime mover is activated which causes chains 36 and 37 to move as noted above and, as well, causes belts 42 to be driven by pulleys 41 and, also, cutting blades 45 and 46 are driven by belt 54 via pulleys 52 and 53, respectively. With the apparatus in motion, the plants 35 are placed on the on-loading apron of the surface 30 by the field crew. An operator, preferably positioned at the rear-center of the apparatus, moves the plants 35 from the apron location into the chain area so that the plants are engaged by the lugs 36A and 37A on chains 36 and 37, respectively. Once the plants are thus engaged, the chain will push the plants forwardly (see arrows) whereupon additional plants can be placed on the chain by the operator. It has been found that the use of the lugs is advantageous in that the plants are forced forward by the chain at a prescribed rate wherein a bottleneck is not produced by the plants. Moreover, the plants are moved at a regular and uniform spacing which is found to improve operation of the apparatus.

Once the plants 35 have been moved by the chain (e.g., chain 36), the plant container is engaged by belts 42 and moved through channel 44 thereby. However, inasmuch as well or barrier 43 is stationary (relative to the length of channel 44), belt 42 tends to move the plant 35 through channel 44 in a somewhat elliptical fashion. That is, the plant is driven forwardly (to the left) by the belt 42 while, at the same time, the plant is rotated about its own axis. Described somewhat differently, the belt 42 causes the plant 35 to rotate about the axis of the plant and, simultaneously, to move toward the left in FIG. 4. This motion has the effect of causing all sides of the plant within the container to be placed adjacent to belts 42 and, thus, exposed to blades 45 and 46. Blades 45 and 46 are rotating at a relatively rapid rate (in the manner of a rotary lawn mower). The blades are rotating in, essentially, a vertical plane relative to the plants so that as the plants pass the blade, the sides thereof are exposed to the blades and any portions of the plant which extend within the path of the blades are immediately pruned from the plant. By adjusting the position of blades 45 and 46 by moving support rod 50, for example, the cutting width of the plants within channel 44 can be adjusted.

The belts 42 continue to drive any pots in channel 44 past the blades 45 and 46 onto the belt 35 which is associated with conveyor 28. The plants then tend to move toward the front off-loading portion of surface 30. When the plants reach the conveyor portion or the front portion of the apparatus, they are removed by other workers who then place the plants and containers onto the ground in the wake of the apparatus.

While it has not been described in detail, channel 55 operates in a similar fashion to trim plants placed therein. In the embodiment shown, the plants are then ejected from channel 55 and caused to move adjacent to barrier 29 in response to driving by belt 56 until the plants reach the conveyor belt 35 and are retrieved therefrom. Of course, the driving apparatus, including the driver's seat 13, and so forth, can be rearranged and the extra diversion channel at the output of channel 55 can be eliminated.

Figure 5:
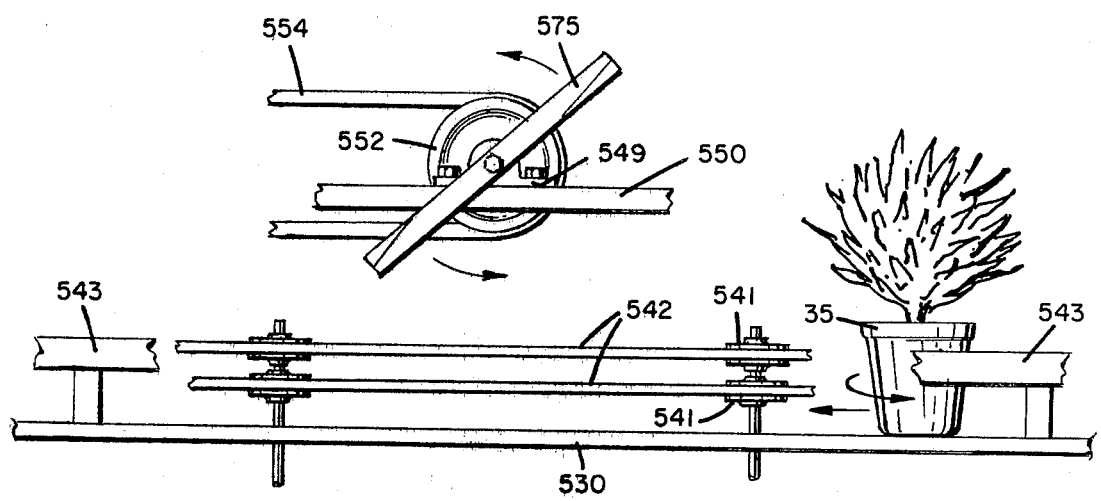
FIG. 5 is a close-up view of the cutting and transporting apparatus shown from the side and with the cover apparatus removed.

Referring now to FIG. 5, there is shown a portion of the plant channel with portions thereof broken away for convenience. In addition, elements which are similar to elements shown in FIG. 4 bear similar reference numerals with the prefix 5. That is, elements 50 and 550 are similar in nature.

In FIG. 5, a plant 35 moves from right to left. The plant rests on surface 530 and is moved by belts 542 which are driven by pulleys 541. The bars 543 are shown schematically. The plant 35 is driven by belts 542 and is, effectively, dragged against bar 543. Consequently, plants 35 tend to rotate in the direction shown by the circular arrow associated therewith.

The relative mounting of blade 575 in bushing 549 on support rod 550 is provided. The pulley 552 and belt 554 which are used to cause blades 575 to rotate (see arrows) are also shown. Thus, it is seen that the plant 35 is driven past the rotary blade 575 (as the plant rotates) wherein the cutting edge of the blade operates to cut or trim the overhanging portions of plant 35. It will be apparent through the analysis of FIGS. 4 and 5 that the blade 575 is operative to perform the cutting operation while the blade is in the upstroke, i.e., while cutting edge is moving upwardly relative to the plant. Moreover, the plant is turning into the blade. This arrangement provides a better cutting operation on the plant.

Figure 6:
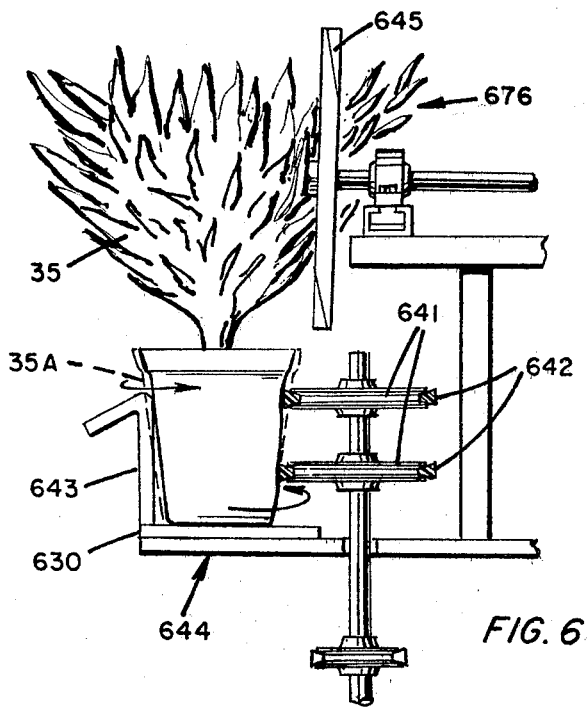
FIG. 6 is a close-up, detailed, end view of the transport channel and the cutting apparatus of the embodiment shown in FIG. 1.

Referring now to FIG. 6, there is shown an end view of the cutting channel to provide greater detail in the cutting apparatus operation. Again, similar elements bear similar reference numeral digits with the initial digit 6. In FIG. 6, the plant 35 has been driven into contact with blade 645 by belts 642. It is seen that the right side of the plant has a relatively smooth or shaped configuration while the left side, which has not yet been trimmed, is somewhat overgrown and nonuniform. The clippings 676 are shown being discarded through the operation of blades 645.

It is noted in FIG. 6 that the surface 630 of the channel 644 is movable relative to the rod or support structures 650. In point of fact, either the barrier 643 or the support structure 650 can be movable wherein the net effect or providing a wider cutting margin is provided.

Also, it is seen in FIG. 6 that the container 35A is slightly deformed (squeezed inwardly). This occurs because of the modest forces applied to the container 35A by the channel members. If the forces are not applied sufficiently, the plant is not properly driven and/or rotated. Of course, too much force is undesirable also. Typically, this force (or channel adjustment) is derived empirically.

Figure 7:
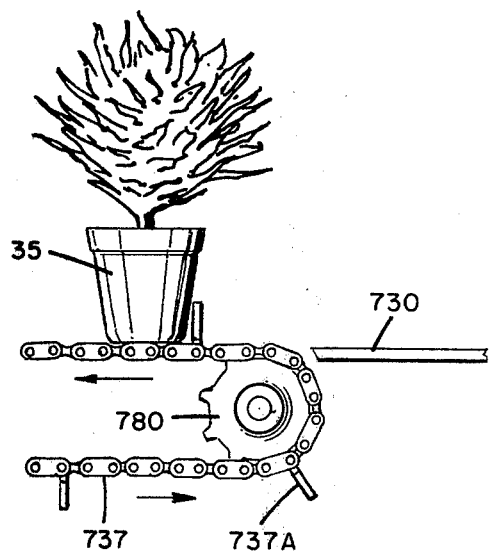
FIG. 7 is a broken-away portion of the chain drive apparatus used in the embodiment shown in FIG. 1.

Referring now to FIG. 7 there is shown a detailed drawing portion of the chain and drive shown in FIG. 4. In particular, a chain 737 (similar to chain 37) is shown engaging sprocket drive 780. Sprocket 780 is mounted relative to surface 730 in any suitable fashion. A plurality of pusher lugs 737A are affixed to chain 737 and moved therewith. The lugs are arranged to engage the lower portion of a plant container 35 in order to push same along the chain path in engagement with the belt drives as shown in FIGS. 4 through 6.

Thus, there is shown and described a unique apparatus which is usable in the nursery business. The apparatus is, in the preferred embodiment, a mobile, self-contained unit which can be moved to the location where the pruning is to take place. Thus, the pruning can be performed in a field or remote location of the nursery. The apparatus is readily, easily fabricated and assembled on a suitable chassis. At least one channel is provided for passing containerized plants therethrough adjacent to a cutting tool. This permits a vertical cut to be made relative to the plant, wherein the plant is advantageously trimmed and shaped. The channel is arranged to cause the containerized plant to move in a linear direction and, at the same time, in a rotating manner along the linear direction whereby the total outer periphery of the plant is exposed to the cutting tool. The cutting pattern relative to the plant is adjustable to accomodate varying sizes of plants and containers. The apparatus is controlled from either end thereof and can be readily operated by personnel associated with the machinery. In using the pruning apparatus of the instant invention, a crew of four men can prune 38,000 plants in an 8-hour shift. The cost savings over the prior art method is a dramatic improvement factor of about 12.

The embodiment shown and described herein is intended to be illustrative only. Modifications thereto may be conceived by those skilled in the mechanical arts. However, any such modifications which fall within the purview of the description are intended to be included therein as well. This description is not intended to be limitative of the invention. The scope of the invention is limited only by the claims appended hereto.

Having thus described a preferred embodiment of the invention, what is claimed is:

1. In a trimming apparatus,
   a cutting device mounted adjacent a path for moving items to be trimmed, and
   moving mechanism for moving said items along said path in a linear direction while concurrently rotating said items relative to said cutting device.
2. The trimming apparatus recited in claim 1 wherein, said cutting device comprises a rotating blade.
3. The trimming apparatus recited in claim 1 wherein, said moving mechanism comprises a drive means for imparting motion to one portion of said item and a relatively stationary bar means for producing a frictional drag to another portion of said item.
4. The trimming apparatus recited in claim 1 including,
   input means for receiving said items and transporting said items to said moving mechanism.
5. The trimming apparatus recited in claim 4 wherein, said input means includes chain drive means for pushing said items.
6. The trimming apparatus recited in claim 3 wherein, said bar means is selectively adjustable to permit said path to be adjusted to accept different sizes of said items.
7. The trimming apparatus recited in claim 1 wherein, said cutting device is adjustable in order to produce different trimming sizes to said items.
8. The trimming apparatus recited in claim 1 wherein, said cutting device and said moving mechanism are mounted on a wheeled base for easy transportation.
9. The trimming apparatus recited in claim 1 including,
   cover means disposed over said cutting device and said moving mechanism.
10. The trimming apparatus recited in claim 1 wherein, said items comprise nursery stock.

* * * * *